J. WILSON.
BALL BEARING.
APPLICATION FILED APR. 14, 1917. RENEWED APR. 24, 1918.
1,285,867.
Patented Nov. 26, 1918.
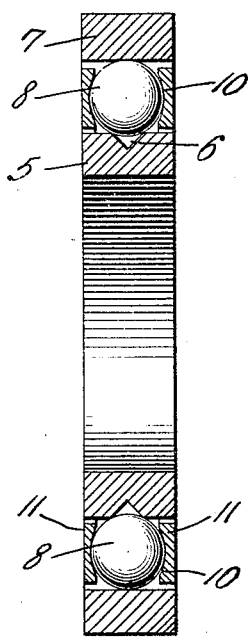
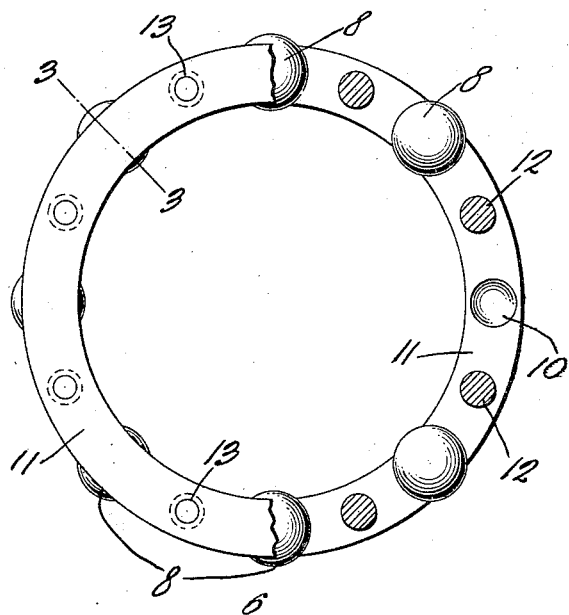
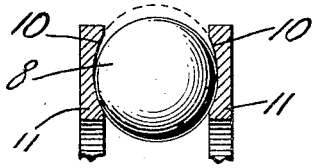
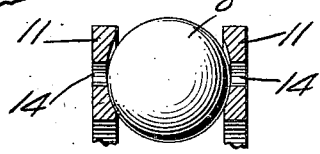
Inventor
James Wilson
By Davis Bell & Moore
Attorney

UNITED STATES PATENT OFFICE.

JAMES WILSON, OF JAMESTOWN, NEW YORK, ASSIGNOR TO SALISBURY BALL BEARING CORPORATION, OF JAMESTOWN, NEW YORK.

BALL-BEARING.

1,285,867.  Specification of Letters Patent.  Patented Nov. 26, 1918.

Application filed April 14, 1917, Serial No. 161,984. Renewed April 24, 1918. Serial No. 230,613.

*To all whom it may concern:*

Be it known that I, JAMES WILSON, a citizen of the United States, residing at Jamestown, in the county of Chautauqua and State of New York, have invented certain new and useful Improvements in Ball-Bearings, of which the following is a specification, reference being had therein to the accompanying drawing.

This invention relates to improvements in ball bearings, one object of the invention being the provision of a simple and efficient method of retaining the balls relative to each other and so as to insure the proper rotation thereof between the inner and outer bearing rings, the said balls being therefore allowed to rotate upon their axes.

A further object of this invention is the provision of a ball retainer in which it is possible to adjust the play of the balls in their respective races so accurately as to permit the snapping of the retainer into the ball races in such a manner so that the balls will be held in the race when the outer ring is removed, such construction also permitting the reverse action, that is, the easy removal of the balls from the race with the retainer, this feature being especially valuable in the assembling or taking apart of the bearing.

In the accompanying drawings:

Figure 1 is a cross section through the bearing, constructed according to and embodying the present invention.

Fig. 2 is a plan view of the ball retainer with the balls in place, a portion of the retaining ring being broken away to show the mounting of the balls therein.

Fig. 3 is an enlarged detail sectional view taken on line 3—3 of Fig. 2.

Fig. 4 is a similar view of a modified form.

Figs. 5 and 6 are detail views showing the method of stamping the retaining rings from thin metal.

Referring to the drawings, the numeral 5 designates the inner bearing ring which is provided with the ball race 6 and 7 designates the outer bearing ring which has a plain ball receiving surface.

The balls 8 are mounted so as to engage the ball race 6 and are themselves disposed so as to be supported axially within the depressions or recesses 10 of the two retaining rings 11, these retaining rings being connected together by means of the cylindrical tie rods 12 whose reduced ends are passed through the apertures 13 and riveted or otherwise secured so as to retain the rings against inward and outward displacement.

As shown in Fig. 3, it will be noted that the recesses to receive the balls are of such a size as to permit the balls slight outward movement, this play being sufficient to permit the retainer and the balls to be snapped upon the inner ring 5 so that the balls will rest in the ball race 6 and thus coöperate with the ball race to retain the balls and retainer against longitudinal movement, this being a feature of great importance in the assembling or taking apart of the bearing.

As shown in Fig. 4 of the drawings, the recesses are provided with the openings 14 which reduce the frictional area of the ring where it contacts the ball, yet at the same time permits of play, as in the other instance.

It will be noted that the recesses formed in the retaining rings for supporting the balls are of lesser diameter than the width of the ring and therefore provide the smallest possible receptacle and contact surface relative to the ball so that the ball is permitted to rotate freely between the bearing rings and due to the positioning of the same within the recesses of the retaining rings will be rotated upon their axes.

As shown in Figs. 5 and 6 the retaining ring 11' is made of thin metal so that the depression or recesses 10' may be formed therein by a stamping operation, the openings 13' being formed simultaneously therewith. In this manner, a thin resilient retaining ring is produced which will hold the balls properly assembled.

What I claim as new is:

1. In a ball bearing, a retainer comprising two spaced retaining rings the opposite faces of said rings being provided with a plurality of opposed recesses of lesser diameter than the width of the ring, tie rods for holding the retaining rings relative to each other, and a plurality of balls, each ball being mounted between its respective pair of opposed recesses and capable of slight radial movement.

2. The combination in a ball bearing, of a bearing ring having a recessed ball race, and a retainer comprising two spaced retaining rings, the opposite faces of said rings being provided with a plurality of opposed recesses of lesser diameter than the width of the ring, tie rods for holding the retaining rings relative to each other, a plurality of balls, each ball being mounted between its respective pair of opposed recesses and capable of slight radial movement, whereby the balls and retainer may be slid upon the bearing ring to snap into the race and be held against longitudinal displacement by the seating of the balls within the race.

3. In a ball bearing, a retainer comprising two spaced retaining rings made of relatively thin and resilient metal, the opposite faces of such rings being provided with a plurality of opposed recesses of lesser diameter than the width of the ring and with apertures for receiving tie rods, tie rods for fitting in such apertures for holding the retaining rings relative to each other but permitting sufficient resiliency to allow the balls to be snapped between the rings relative to their recesses, and a plurality of balls mounted between the rings in said recesses and capable of slight radial movement.

In testimony whereof I affix my signature.

JAMES WILSON.